Figure 1:
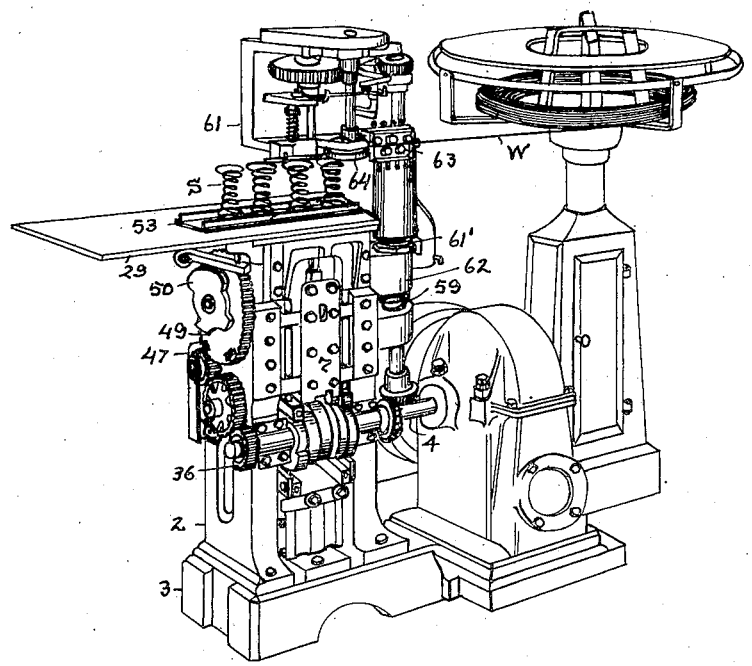

April 29, 1930.　　　D. T. OWEN　　　1,756,434

MACHINE FOR FABRICATING SPRING STRUCTURES

Filed Dec. 21, 1926　　11 Sheets-Sheet 1

Inventor

D. T. OWEN

By　　　　　　　
Attorney

April 29, 1930. D. T. OWEN 1,756,434
MACHINE FOR FABRICATING SPRING STRUCTURES
Filed Dec. 21, 1926 11 Sheets-Sheet 2

April 29, 1930.  D. T. OWEN  1,756,434
MACHINE FOR FABRICATING SPRING STRUCTURES
Filed Dec. 21, 1926   11 Sheets-Sheet 3

Inventor
D. T. OWEN
By
Attorney

April 29, 1930.　　　　　D. T. OWEN　　　　　1,756,434
MACHINE FOR FABRICATING SPRING STRUCTURES
Filed Dec. 21, 1926　　11 Sheets-Sheet 5

Inventor
D. T. OWEN
Attorney

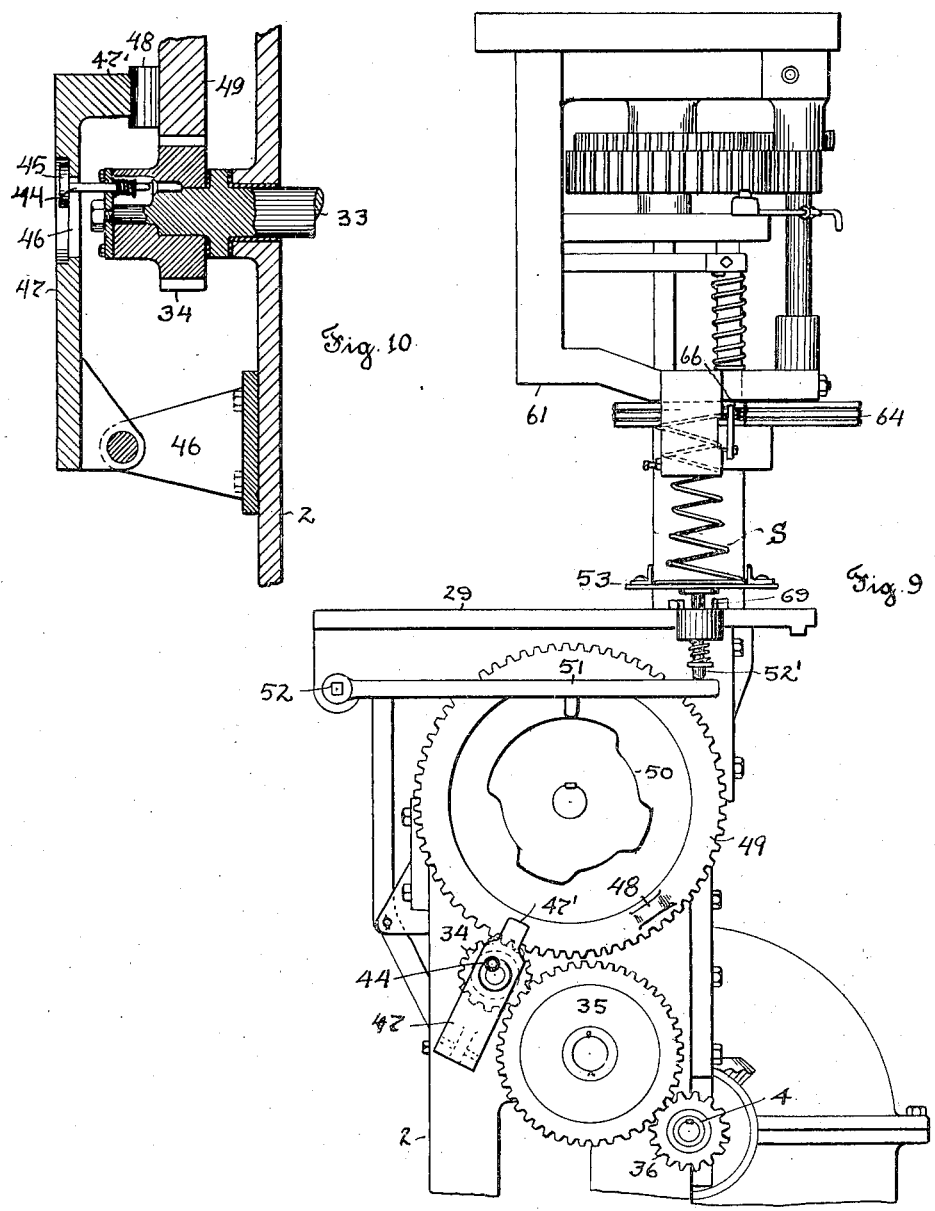

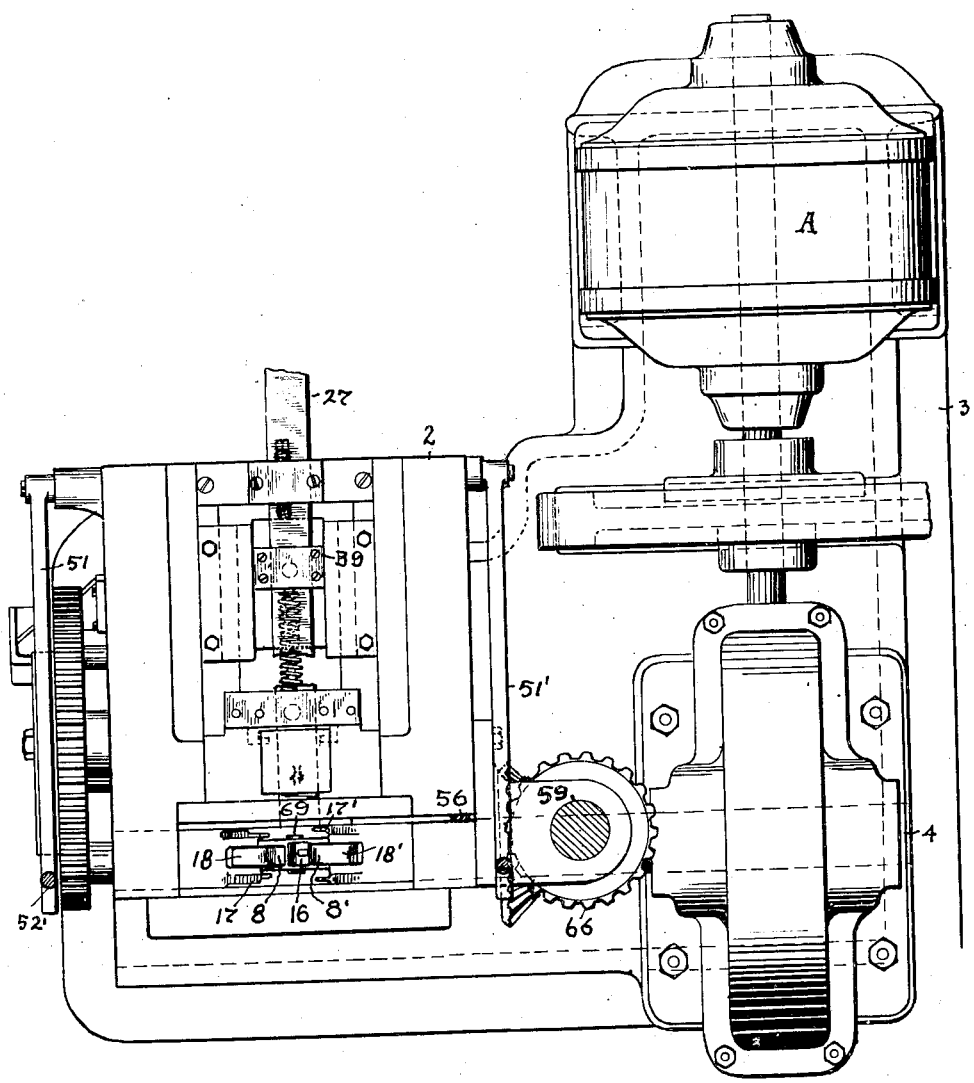

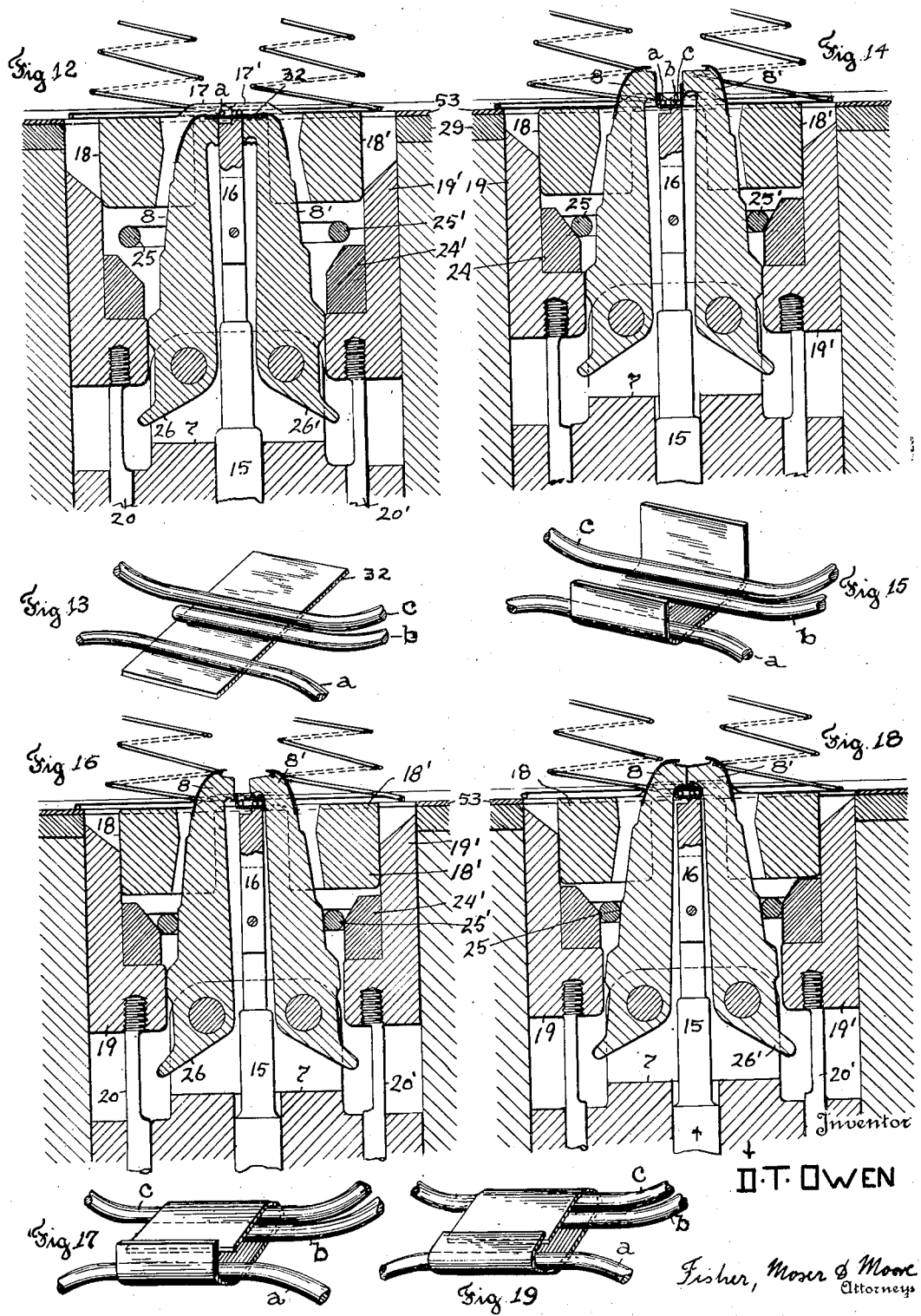

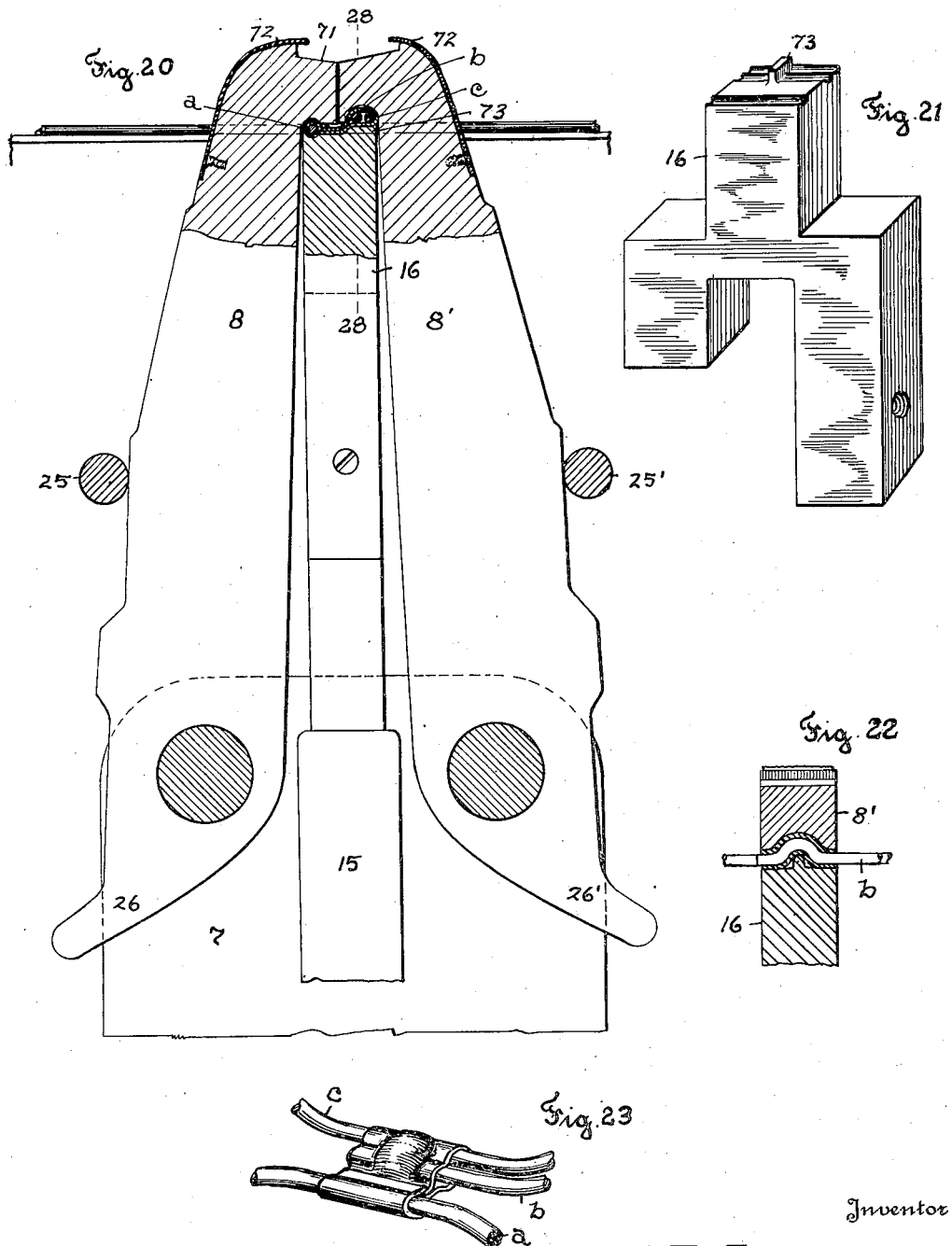

April 29, 1930. D. T. OWEN 1,756,434
MACHINE FOR FABRICATING SPRING STRUCTURES
Filed Dec. 21, 1926 11 Sheets-Sheet 10
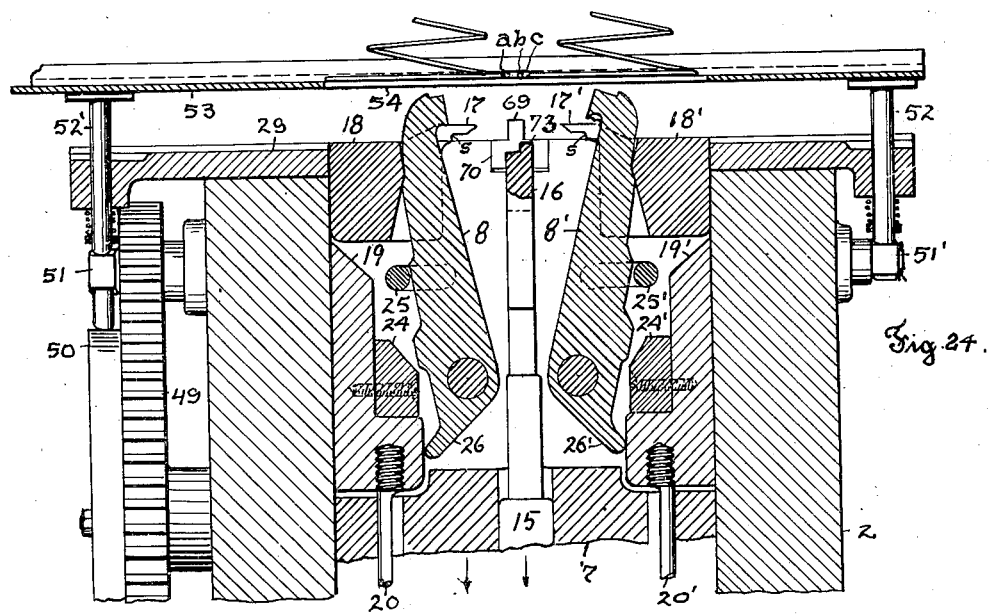
Inventor
D. T. OWEN

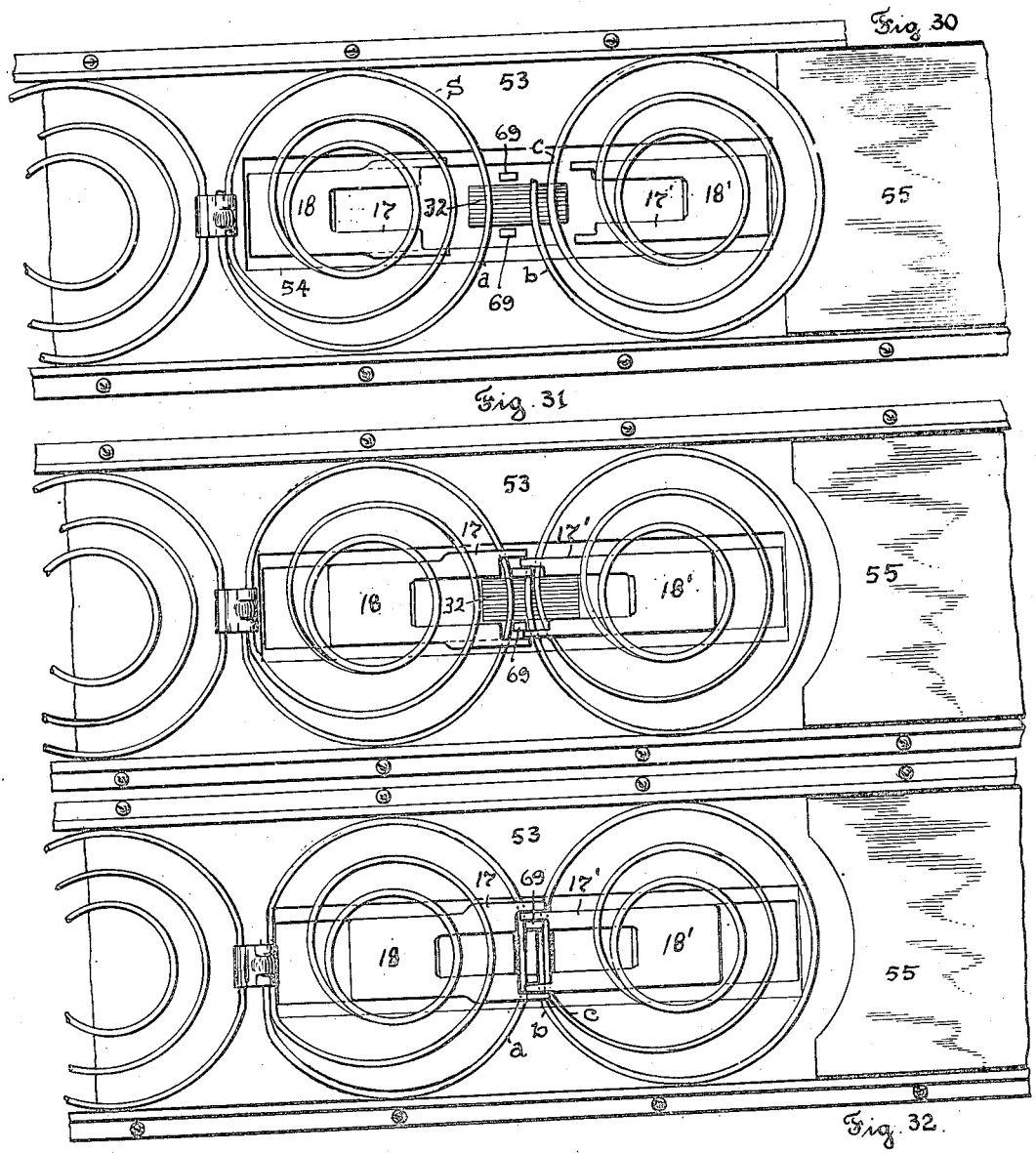
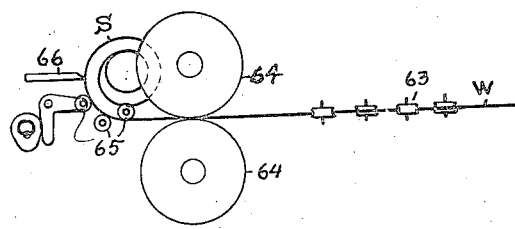

Patented Apr. 29, 1930

1,756,434

UNITED STATES PATENT OFFICE

DAVID T. OWEN, OF CLEVELAND, OHIO, ASSIGNOR TO THE OWEN AUTOMATIC SPRING MACHINERY COMPANY, OF CLEVELAND, OHIO, A CORPORATION OF OHIO

MACHINE FOR FABRICATING SPRING STRUCTURES

Application filed December 21, 1926. Serial No. 156,202.

My invention relates to spring clipping machines, and the present machine is an improvement in the machine shown and described in Letters Patent of the United States, No. 1,512,990, dated October 28, 1924. Thus my improved machine is especially designed to simplify the fastening of a plural number of spiral springs together in a straight row by means of metal clips. The clips are formed by compactly arranged mechanism located beneath a flat table or top upon or over which the springs may be conveniently seated, and this mechanism is particularly arranged so that the connected springs may be freely shifted lengthwise as connected to facilitate and expedite clipping operations. Furthermore, the springs may be fed singly and successively to the clip forming mechanism without interference, and the springs which have been united together may be jointly shifted automatically without interference with the clipping devices to permit another spring to be brought into place above said devices. The present machine also embodies means adapted to bend and straighten the wires preliminary to clipping operations, and provision is made also to fasten three wires together within one clip. Two of these wires are rigidly united to each other and the clip, one wire forming the main body of the bottom loop of the spring while the other is a continuation of the first and forms the end or extremity of the same loop. By fastening the end of the loop to the body thereof an endless closed loop is produced for one spring, and the clip becomes a rigid extension thereof. On the other hand the second spring comprising the third wire is hinged or pivotally secured within the clip. This specific form of metal tie or clip connection is shown and described in my application for patent filed on the 21st day of October, 1926, Serial No. 143,090, and its production involves the bending and upsetting of the clip itself and two of the wires within the clip, the purpose being to produce an interlocking union of exceptional rigidity adapted to withstand a heavy strain. As shown herein the machine is also constructed to feed wire intermittently from a reel into and through spiral-spring forming mechanism mounted above a table top, and furthermore to operate such spring forming mechanism in timed co-operation with said clipping mechanism. Thus as each spiral spring is automatically produced it is seated upon or above the table where wire straightening and clipping operations may begin. When the clipping operation has been completed the springs which have been clipped together are then shifted a predetermined distance horizontally over the table, and the operation of forming a new spring and clipping it to the last spring in the row, is repeated. When a given number of springs have been made and clipped together, in a straight row, the feeding movement of the stock from which the clips are made is temporarily suspended to prevent a clip from being made. During this inactive period of clip forming operations the finished row of springs is removed and a new spring is being formed and shifted to one side of the clip forming devices together with the seating of a second spring adjacent thereto, whereupon the clip forming devices again become active to tie these two springs together, and to repeat the operation with others as in the first instance.

Figure 2:
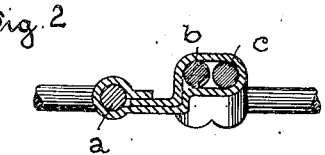
Figure 3:
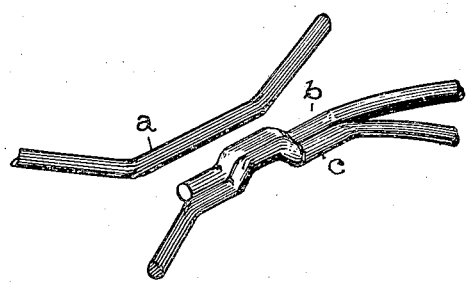
Figure 4:
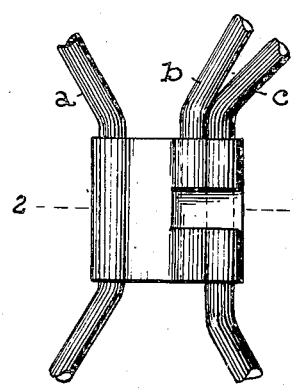
Figure 5:
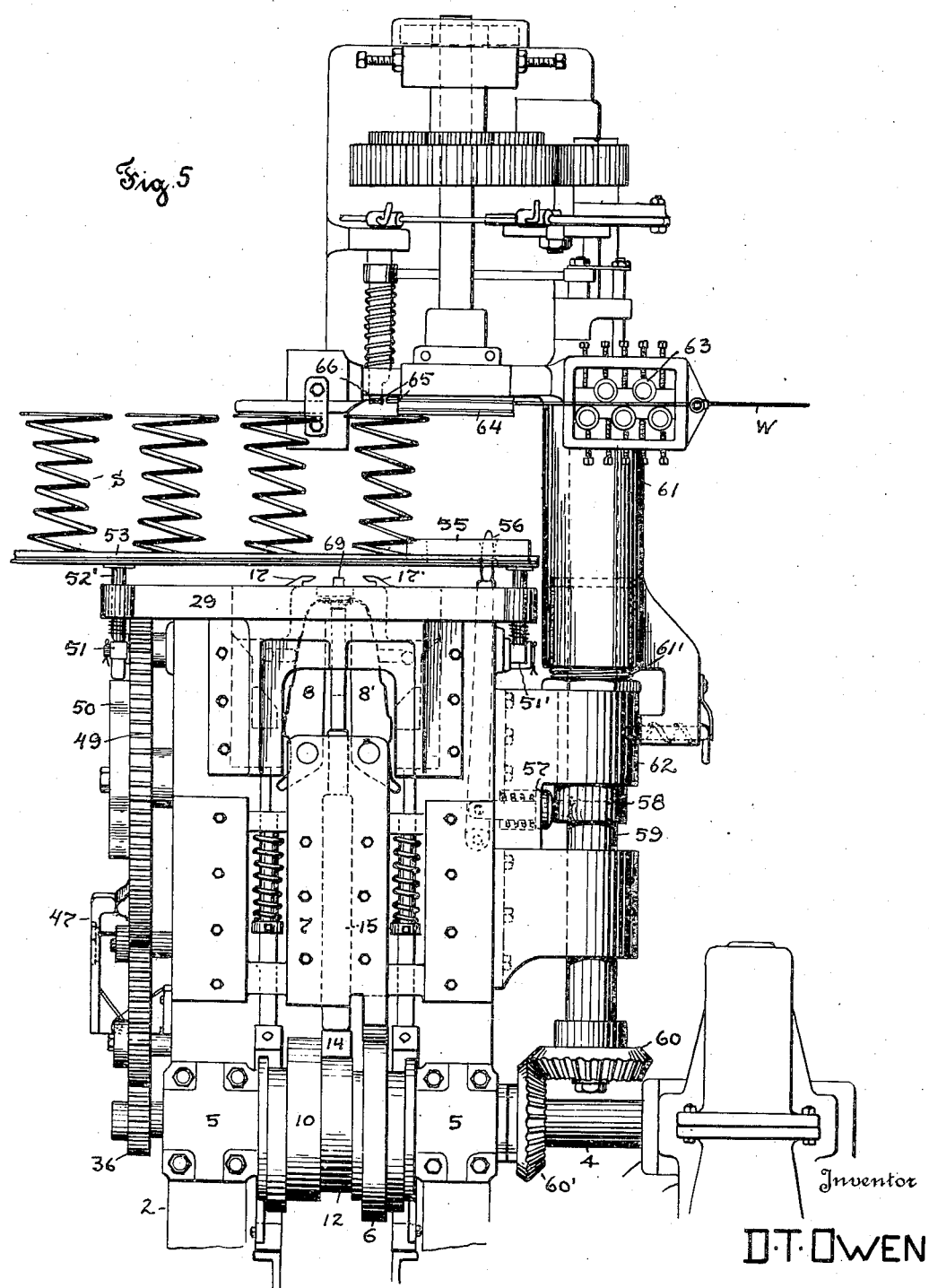
Figure 6:
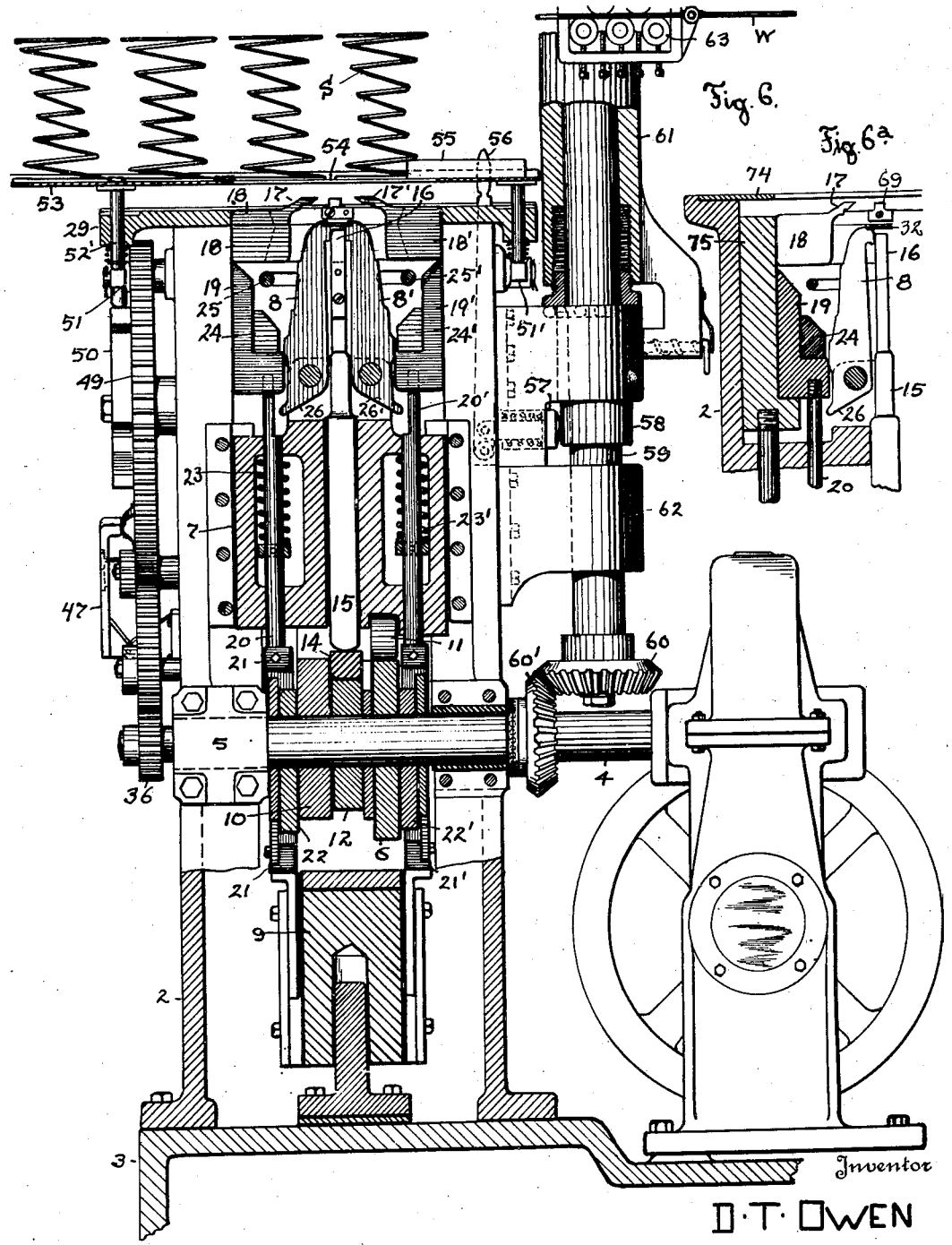
Figure 7:
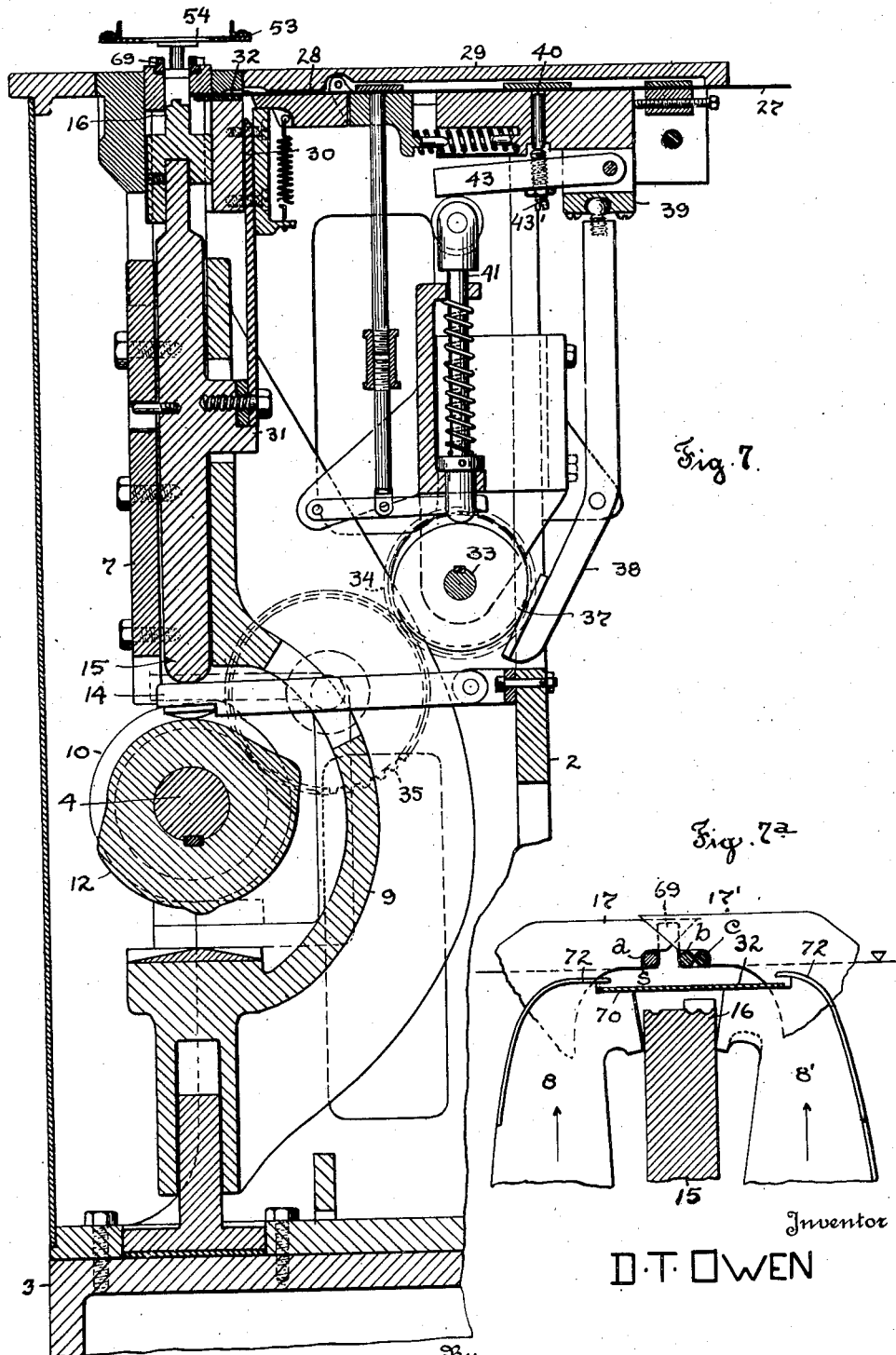
Figure 8:
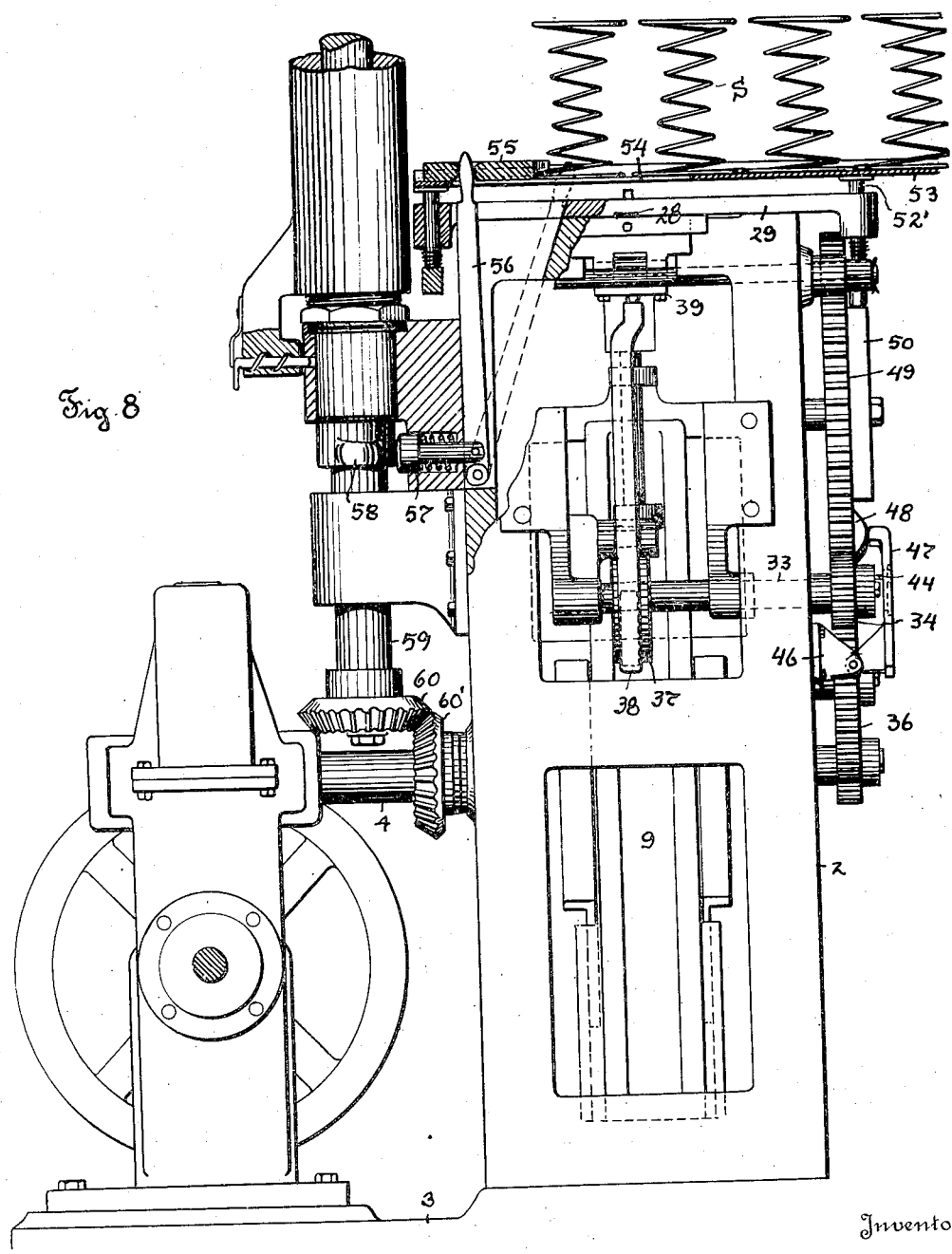

In the accompanying drawings, Fig. 1 is a perspective view of the complete machine. Fig. 2 is a sectional view, enlarged, of a finished clip, on line 2—2 of Fig. 4. Fig. 3 is a perspective view of the three spring wires as they appear after clipping operations, the clip itself being omitted. Fig. 4 is a bottom view of the finished clip and three wires shown in Fig. 2. Fig. 5 is a front view of the upper part of the machine. Fig. 6 is a sectional view vertically of the base part of the machine on the line of the cam shaft. Fig. 6ª is a sectional view of a modification. Fig. 7 is a vertical section centrally through the machine in the plane of the upsetting plunger and the strip feeding device. Fig. 7ª is an enlarged detail view of the clip folding dies conveying a blank toward three spring wires which are clamped in parallel position to receive the blank. Fig. 8 is a rear view of the base part of the machine, partly in section. Fig. 9 is an end elevation of the upper parts of the machine. Fig. 10 is a sectional view of the clutch mechanism for stopping stock feeding operations temporarily at intervals. Fig. 11 is a plan view of the machine, the seating plate for the springs and other parts being removed to show the clip forming mechanism. Fig. 12 is a sectional view, enlarged, of the clip forming mechanism partly closed and about to move upwardly, and Fig. 13 is a perspective view of the wires and clip blank as assembled in Fig. 12. Figs. 14 and 15, correspond to Figs. 12 and 13, but show the clip partly folded. Figs. 16 and 17 are also like Figs. 12 and 13, excepting that an additional fold has been made in the clip. Figs. 18 and 19 are sectional and perspective views corresponding to Figs. 16 and 17, but showing the clip wrapped completely around the wires. Fig. 20 is a front view, partly in section and on a large scale, of the clip folding members and the upsetting die in finishing position. Fig. 21 is a perspective view of the upsetting die. Fig. 22 is a sectional view of the upsetting die and one folding jaw on line 28—28 of Fig. 20, showing the indented clip and wire therein. Fig. 23 is a perspective view of the clip and three wires as they appear at the end of the clipping operation. Fig. 24 is a sectional view of the upper part of the machine, corresponding to Fig. 18, but showing the pivoted die members open and the spring seating plate raised as occurs at the end of each clipping operation. Figs. 25 and 26, are perspective views of the wire straightening and positioning slides, and Figs. 27, 28 and 29, are perspective views of one positioning finger and a wire in different operating positions. Fig. 30 is a plan view of the spiral springs and the guide plate therefor seated above the wire straightening and clipping mechanism as at the beginning of clipping operations, and Figs. 31 and 32 are similar views showing the successive steps of shifting and straightening the wires preliminary to clip folding operations. Fig. 33 is a diagrammatic view of a conventional form of spring coiling means.

Structurally considered, the machine comprises a main frame 2 mounted upon a bed plate 3 which supports an electric motor A in power transmitting connection with a cam shaft 4 operating in bearings 5 at the front of frame 2. A set of cams on shaft 4, see Fig. 6, reciprocate a number of vertically arranged parts adapted to slide within suitable guide ways within frame 2, which parts function primarily to produce a clip and to unite the bottom loops of two spiral springs together by said clip as it is being produced. Thus one cam 6 on shaft 4 serves to raise a slidable cross head 7 carrying two pivoted die members 8—8′ for folding the clip. Cross head 7 has a curved foot portion 9 adapted to be engaged by a second cam 10 on shaft 4, which cam co-acts with cam 6 in lowering the cross head, and a roller 11 may be interposed between cam 6 and the cross head to reduce friction. A third cam 12 on shaft 4 engages a pivoted bar 14 which is used to lift a central plunger 15 slidably confined within cross head 7 and carrying an upsetting die 16 at its upper end for indenting the clip and two of the spring wires within the folded clip. The spring wires are first straightened and firmly clamped in the line of vertical movement of dies 8—8′ and upsetting die 16 by two pairs of positioning fingers 17—17′ forming integral extensions of two horizontally movable blocks 18—18′ seated within the top of frame 2 on opposite sides of the pivoted dies 8—8′, see Fig. 6. Blocks 18—18′ are forced toward each other by a pair of vertically-movable wedge members 19—19′ affixed to upright rods 20—20′ which slide in cross head 7 and have yokes 21—21′ at their lower ends adapted to be engaged by separate sets of cams 22—22′ on shaft 4. Coiled springs 23—23′ are sleeved on rods 20—20′ within cross head 7 to promote noiseless operations and cam blocks 24—24′ are fixed to wedge members 19—19′ where they will engage steel rollers 25—25′ and force the pivoted die members 8—8′ toward each other. An opening movement of die members 8—8′ is produced when wedge members 19—19′ are lowered and caused to strike the fingers 26—26′ on the lower ends of the pivoted die members 8—8′. In this spreading or opening movement the upper ends of said die members engage the horizontal blocks 18—18′ and force them apart and back to their original rest positions, thereby releasing the connected springs from the pairs of positioning fingers 17—17′, all as hereinafter more fully described.

A narrow strip of metal 27 from which the clip is made passes forwardly through a slot 28 in the table top 29 across a vertical knife or cutter 30 which is bolted to a lug 31 at the rear of plunger 15, see Fig. 7. This knife severs strip 27 into rectangular blanks 32 of predetermined size during upsetting operations, and these blanks are pushed singly and successively over the top of upsetting die 16 and also upon the recessed or shouldered tops of the two pivoted die members 8—8′ when said plunger and die members are pressed closely together and stand at rest in their lowermost positions as indicated in Fig. 6. Feeding of the blanks is effected by feeding metal strip 27 at intervals. Thus a countershaft 33 in the rear of frame 2 is adapted to be rotated by a train of gears 34, 35, and 36, leading to main shaft 4, and a cam 37 on countershaft 33 is engaged by one arm of a pivoted lever 38 connected to a reciprocable slide 39 over which strip 27 passes. A vertical pin 40 within slide 39 is adapted to grip strip 27 and feed it forward during a forward movement of the slide, and gripping is effected for an interval by uplift of a spring-pressed rod 41 which rests at its lower end on cam 37 and bears at its upper end against the free end of a pivoted arm 43 having a set screw 43' engaging gripping pin 39. Further detailed description of this strip feeding means is omitted as I do not wish to limit myself in this application to any specific form of feeding mechanism and because many different feeding devices may be used. However, the present machine embodies means adapted to stop feeding of the metal strips and blanks at intermittent intervals, which result is obtained by temporarily disconnecting countershaft 33 from the power shaft 4. This cessation in feeding is automatically timed to occur when a desired number of springs have been connected together and a new row of springs is to be produced. In other words after a series of blanks have been fed forward and operated upon, one blank is withheld from the dies and one cycle of operations of the clip forming devices proceeds without clipping two springs together. Feeding of the springs continues without break however, so that when the first clip in each series is produced two springs will be seated on opposite sides of the dies.

Any suitable clutch means may be used to throw countershaft 33 on and off at intervals, and in Figs. 9 and 10 I exemplify one form of throw-out device which may be adopted, comprising a shiftable key or shot bolt 44 for gear 34 and countershaft 33. Key 44 is spring-pressed and formed with a head 45 adapted to travel in an orbit in an opening 46 in an arm 47 which is pivoted at one end to a bracket 46 on main frame 2. Arm 47 is provided with a lug or offset 47' at its opposite end which is adapted to be engaged for a brief interval by a lateral projection 48 on the rim portion of a large spur gear 49 which is driven by gear 34. Arm 47 is thereby tilted on its pivot and the shot bolt or key is withdrawn sufficiently to disconnect countershaft 33. These gears rotate constantly to permit large gear 49 to rotate a cam 50 upon which an oscillatory arm 51 rests. This arm is affixed to a cross shaft 52 which carries a similar arm 51' upon the other side of frame 2, and the free ends of these arms support spring-pressed posts 52' which are adapted to raise and lower a flanged guide plate or table 53 for the springs S. Cam 50 is constructed to raise and lower table 53 a predetermined number of times, dependent upon the number of springs to be connected in a row. As shown, cam 50 is designed for use in connecting four springs together in a straight row. Four springs require three clips, and each time two of the springs are to be united together table 53 is lowered to bring the bottom loops of the springs in substantially the same horizontal plane as the straightening and positioning fingers 17—17'. Table 53 has an opening 54 to receive said fingers and the clip folding and upsetting dies, and the springs S are seated singly and successively upon said table and shifted lengthwise thereof across said opening and the dies. Seated upon one end of table 53 is a push member 55 for the springs, and this push member is reciprocated at intervals by a pivoted lever 56 which stands in an upright position normally and passes through a slot in push member 55, see Fig. 8. A spring-pressed thrust member 57 is connected to lever 56, and a cam 58 on an upright shaft 59 presses member 57 inwardly for a brief interval during each revolution of said shaft which receives its power from main shaft 4 through bevel gears 60—60'.

Upright shaft 59 transmits power to suitable spring forming mechanism shown in the present instance as mounted upon a swinging frame 61. That is, frame 61 is swiveled on shaft 59 and supported for vertical adjustment above table 53 upon a screw-threaded post and nut 61' carried by side bracket 62. The spring wire W first passes through straightening rollers 63 and thence through feed rollers 64 to a series of coiling rollers 65, and finally past a knife or cutter 66. Such spring forming mechanism is old and well known to those skilled in the spring making art and I do not claim to be the inventor of such coiling mechanism apart from the working combination disclosed herein. However, I believe it to be new to mount such spring forming devices in a swiveled position upon a vertical shaft 59 and to cause the production of a coiled spring of any desired shape or kind simultaneously with clipping operations, each finished spring S being seated upon a vertically-movable guide plate or table 53 in advance of a push member 55. Seating of the springs may be accomplished automatically without human assistance, or the operator may swing frame 61 to one side and transfer the finished springs to table 53 by hand if he so desires.

In either case let us assume that the machine is operating and that operations are about to begin upon a spiral spring S seated upon one end of table 53 which remains in an elevated position for one cycle of clip producing operations. At this time no clip blank is fed to the dies and therefore no clip is produced while the clipping devices are acting in that cycle of operations. But push member 55 is in a position to shift the first spring to the left of the dies, and when this has taken place and the pusher has returned to starting position the second spring is seated in the exact position occupied formerly by the first spring. Table 53 is now lowered which brings the wires of the bottom loops of both springs to a lower horizontal plane than the hook-shaped fingers 17—17'. The two springs are now situated on opposite sides of the clip forming dies, and the opposed sets of hook-shaped fingers are spread apart so that each set of fingers occupy a position well within the borders of the bottom loop of each spring. The fingers within the bottom loop of the spring at the left of the dies are now in a position to ride over the closed side of the loop of spring S at the left of the dies, see Fig. 30. To make this clearer the closed side of the bottom loop of each spring may be considered as the single wire $a$, and the open side of each bottom loop may be said to comprise two wires $b$ and $c$, respectively. Thus $b$ represents the free extremity of the open loop, and $c$ represents the main body of the same loop opposite extremity $b$ at the gap or opening therein. Thus when the hook-shaped fingers within the bottom loop of each spring begin to move toward the dies they are in position to ride over wires $a$ and $c$ and as this movement continues wire $b$ is engaged and covered. The horizontal movements of blocks 18—18′, which carry the fingers, is effected by the upward movement of wedge members 19—19′, and the initial movement of the wedge members also force the pivoted die members toward each other against upsetting die 15, see Fig. 6. A clip blank is also fed across the top of said die members, but not lifted by dies 8—8′ until the wedge members have forced the wire-engaging fingers together. The extremities of these fingers are beveled to press the wires downwardly as the blocks move inwardly toward each other, and these wires are then engaged by shoulders $s$ at the inner ends of the fingers. As this occurs the springs are shifted bodily toward each other until wire $a$ and wires $b$ and $c$ are pressed tightly against two stationary posts or lugs 69—69 which extend upwardly from steel blocks or hardened metal pieces 70—70 inset rigidly within the stationary top plate of frame 2, see Fig. 27. Then as the closing movement of the blocks continues all three wires $a$, $b$, and $c$ are bent where pressed against posts 69, thereby straightening the wires on parallel lines between the posts and separating wire $a$ from wires $b$ and $c$ by the thickness of the posts while wires $b$ and $c$ are pressed closely together, see Fig. 32. The clip blank is now carried upwardly by the dies against the tightly clamped wires as shown in Figs. 12 and 13. The upward movement of the central die is then arrested temporarily to hold the blank tightly against the wires while the two flanking dies continue their upward movement and bend the opposite ends of the clip blank at right angles around wires $a$ and $c$, see Figs. 14 and 15. That is to say a U-shaped clip is produced after the flat blank has been carried upwardly against the wires to be connected together. To facilitate the carrying of the flat blank upwardly it is fed and deposited within the recesses or pocket 71 formed within the upper ends of the pivoted die members 8—8′ and leaf-spring catches or detaining elements 72 (affixed to the die members) prevent the flat blank from being displaced while it is being carried upwardly.

One bent end of the blank is made purposely longer than the other to enfold the two wires $b$ and $c$, and this longer end is then folded inwardly to overlap said wires by tilting die member 8′ until its jaw is placed in an overhanging position above the central die and said wires $b$ and $c$, see Figs. 16 and 17. Cam block 24′ and roller 25′ cause die member 8′ to tilt at this stage in operations while the other die member remains in an upright position with its jaw pressing against the shorter flange on the clip. But this stationary position of this second die member is only temporary and followed by a tilting movement inwardly to fold the shorter flange over the end of the longer and previously folded flange, see Figs. 18 and 19. The respective jaws of the pivoted die members now abut and overlap all three wires and both folds of the clip.

The next step consists in indenting the clip and wires $b$ and $c$ to lock the clip rigidly to said wires while bending and curling the shorter flange around wire $a$ to provide a pivotal or hinge connection therefor. This result is obtained by imparting a sudden upward movement to plunger 15 and a short downward movement to die members 8—8′, see Figs. 18 to 23. Plunger 15 is a mere follower member interposed between the carrying and folding dies for the blank, and it does not come into action until after a U-shaped clip has been formed and clenched to the wires. By clenching, I mean, final curling of the flanges of the clip around the wires, which result is fostered by round grooves in the dies to produce a tightly fitting clip conforming to the shape of the wires, except where indented across the wires $b$ and $c$. This indentation in one side of the clip is produced by a rib 73 on plunger 15, see Fig. 21, and both wires $b$ and $c$ as well as the clip are indented. An indented tie or union is desirable because it permits the free end of the loop of one spring to be fastened more rigidly to the body of the same loop while clipping two springs together. In so far as I know the present form of clip and working arrangement of dies is new and novel but nevertheless the invention is not necessarily confined to the making of the identical clip shown herein. That is, other forms of dies may be used and other forms of clips may be used with the machine or mechanism described and claimed herein, and the mechanism itself may also be modified within the limits and scope of the invention as claimed.

When the operation of producing a clip and tying two springs together is completed, the two pivoted die members 8—8' are caused to open or spread apart by the lowering of the wedge member 19—19', and the fingers 17—17' are also spread apart and opened, see Fig. 24. The connected springs are then lifted to a higher plane by an upward movement imparted to the guide plate or table 53. The dies are then lowered to starting position, and in the meantime push member 55 is reciprocated to shift the connected springs a given distance to the left where the last spring in the row will be seated on the table at the left of the central die. A new spring may now be seated in the space formerly occupied by the last spring and a repetition of operations may then begin.

In the machine shown and described herein only four springs are assmbled and united together, before feeding and forming operations of a clip are stopped for an interval. However, the machine may be constructed to connect any desired number of springs in a row, and to produce such rows successively, without interruptions or protracted halt in the operations of the machine. It is also obvious that I may use any suitable controlling means to start and stop the machine, such as electric switches for the motor, or clutch mechanism such as commonly employed in many different kinds of machines.

In Fig. 6ª I show a stationary plate or table 74 adapted to seat the springs, and in this modified form of machine I may use the same clip folding and upsetting devices as herein described and indicated by the same numerals. But these devices are mounted upon a separate vertically-movable support 75 to permit all the working parts to be lowered beneath the seating surface of the plate or table. Briefly, instead of raising and lowering plate or table 53 as shown in the other figures, I may employ a stationary plate or table 74, and raise and lower all of the working parts which straighten and connect the wires, thereby removing all obstructions from the path of feeding movement of the spiral springs.

What I claim is:—

1. A machine for producing spring structures, including automatic mechanism for collocating spiral wire springs with their corresponding end loops in the same plane, combined with means for connecting said loops of the collocated springs together automatically.

2. A machine for producing spring structures including means for connecting spiral springs together, and means for delivering spiral springs automatically with their corresponding end loops in the same plane to said spring connecting means.

3. A machine for producing spring structures, including means for collocating spiral wire springs automatically with their corresponding ends in the same plane, means for producing clips automatically, and means for affixing said clips to the collocated springs automatically.

4. A machine for producing spring structures, including means for assembling spiral springs in a row automatically with their corresponding ends in the same plane, and clip forming and attaching devices adapted to connect said springs together at their ends in sequence as assembled.

5. A machine for producing spring structures, comprising means for connecting a plurality of spiral wire springs successively in a row, and means adapted to cause said first means to skip a connecting operation at intervals to permit automatic production of separate rows of springs successively.

6. A machine for producing spring structures, comprising means for assembling spiral springs progressively in a row, means for connecting successive springs automatically, and means adapted to render said connecting means inoperative at intervals without cessation of assembling operations.

7. A machine for producing spring structures, including means for producing spiral wire springs sucessively, in combination with means adapted to connect said springs together sucessively.

8. A machine for producing spring structures, comprising means for making spiral springs, means for connecting springs together, and means for delivering the springs from said first means to said connecting means singly and successively.

9. A machine for producing spring structures, comprising means for producing spiral springs continuously, mechanism for assembling the springs as produced, and means for producing and affixing clips to the springs as assembled.

10. A machine for producing spring structures, comprising spring-forming mechanism, means for clipping springs together, means for feeding the formed springs singly and successively to said spring-clipping means, and means for interrupting spring-clipping operations at intervals during spring-feeding operations.

11. A machine for producing spring structures, comprising means for connecting spiral springs together, and means for supporting said springs opposite said connecting means, said supporting means being movably related to the connecting means to permit the connecting means and the springs to be freely engaged and disengaged at the beginning and end of connecting operations.

12. A machine for producing spring structures, comprising a support adapted to seat the corresponding ends of two spiral wire springs closely together, connecting devices for said springs adapted to protrude into the said ends, and means adapted to raise and lower said spring support to vary the position of the springs in respect to said connecting devices.

13. A machine for producing spring structures, comprising means for clipping wire springs together, and means associated therewith adapted to automatically segregate the springs, and elevating means to permit free horizontal shift of the connected springs.

14. A machine for producing spring structures, comprising automatic mechanism for clipping springs together successively, means for feeding springs automatically to said clipping mechanism, and means adapted to suspend clipping operations for an interval during feeding operations after clipping a plurality of springs together.

15. A machine for producing spring structures, comprising means for making spiral springs, means for making clips, said means including dies adapted to clench the clips to adjacent springs, and means for feeding the springs as they are being made to said clenching dies.

16. A machine for producing spring structures, comprising means for feeding wire, means for forming spiral springs from said wire, and means for forming clips and attaching the clips to the springs successively when made.

17. A machine for producing spring structures, comprising spring forming mechanism, clip forming mechanism, coacting dies adapted to clench the clips to the springs, and means for feeding the springs successively to said dies.

18. A machine for producing spring structures, comprising a table, means for making spiral springs and depositing the springs upon the table, clenching dies within the table, means for feeding clip blanks to said dies, and means for feeding the springs to said dies.

19. A machine for producing spring structures, comprising a spring assembling table and means adapted to deposit spiral springs successively upon said spring assembling table, clenching dies within said table, means adapted to raise said dies and a clip blank into engagement with springs deposited on said table, and means adapted to actuate said dies to fold the clip blank in connection with said springs.

20. A machine for producing spring structures, comprising means for making spiral springs having open ends and a free extremity, in combination with clipping mechanism adapted to automatically connect the free extremity of one spring to the body portion of the same spring and also to a body portion of a second spring, and means adapted to feed the springs singly and successively, as they are being made, to said clipping mechanism.

21. A machine for producing spring structures, comprising means for clipping two spiral springs together, one of said springs having an end loop terminating in a free extremity, and means adapted to position the free extremity and a portion of one spring closely together opposite said clipping means, and adjacent to a portion of a second spring to permit said springs to be connected together in a single operation of the clipping means.

22. A machine for producing spring structures, comprising clip forming devices and dies, an upsetting plunger, and sliding devices adapted to automatically shift two spiral wire springs to a predetermined juxtaposed position preliminary to clipping operations.

23. A machine for producing spring structures, comprising clip forming mechanism and clenching dies adapted to affix clips to springs, and means for raising and lowering the springs automatically in respect to said dies.

24. A machine for producing spring structures, comprising a pair of clipping dies, means adapted to place two spiral springs opposite said dies, means for feeding clip stock to said dies, and means for lowering the springs bodily into said dies to permit the clips to be affixed to the springs.

25. A machine for producing spring structures, comprising clip forming devices and dies, means adapted to permit a row of springs to be fed to said dies, said means being arranged to coact with the dies to seat the springs so that the dies will protrude removably into the springs.

26. A machine for producing spring structures, comprising means for clipping two spiral wire springs together, and means adapted to straighten a spiral portion of at least one of said springs preliminary to clipping operations.

27. A machine for producing spring structures, comprising means adapted to clip two spiral wire springs together, and means adapted to straighten and clamp spiral portions of said springs on parallel lines preliminary to clipping operations.

28. A machine for producing spring structures, comprising clip folding dies, means adapted to feed a blank to said dies, and positioning devices movably mounted on opposite sides of said dies adapted to shift two spiral wire springs toward each other with clamping effect on segmental portions of the wires.

29. A machine for producing spring structures, comprising a table having movable wire-clamping devices therein adapted to hold a pair of spiral wire springs in juxtaposition, a vertically movable support for the springs, a set of clip folding members adapted to convey a flat metal blank to said clamping devices and the wires held therein, and means adapted to shift said members upwardly and toward each other to fold the said blank around the wires.

30. A machine for producing spring structures, comprising a pair of vertically movable die members, means adapted to feed a blank upon the top of said die members, means adapted to clamp a pair of spiral wire springs in a stationary position in the vertical line of movement of said die members to permit said blank to be pressed against segmental wire portions of said springs upon the upward movement of the die members, and means adapted to actuate said die members to fold the blank around the clamped wire portions of the springs.

31. A machine for producing spring structures, comprising a set of clip forming dies, means adapted to space two spiral wire springs a short distance apart where said dies may protrude into their corresponding ends, said means projecting between the two springs, and a set of wire-bending devices movably related to said spacing means and co-acting therewith to straighten juxtaposed wires of said springs.

32. A machine for producing spring structures, comprising clip folding mechanism, means adapted to seat two spiral wire springs on opposite sides of said clip folding mechanism, and wire straightening elements projecting between and into said springs adapted to produce spaced bends in the spiral wire of at least one spring between which the clip may be folded.

33. A machine for producing spring structures, comprising a set of clip folding members, a clip indenting plunger located between said members, said members having recessed upper ends adapted to seat a blank, means adapted to clamp a pair of spiral wire springs above said members and plunger, means adapted to raise said clip folding members to convey the blank to said springs and to fold it around parts thereof, and means adapted to reciprocate said plunger to indent the clip and wires.

34. A machine for producing spring structures, comprising a set of pivoted clip folding dies and means adapted to raise and lower said dies and to tilt them on their respective pivots, said dies having means at their upper ends adapted to receive and convey the blank from which the clip is to be produced.

35. A machine for producing spring structures, comprising a table containing clip folding dies, means for clamping a pair of spiral wire springs upon said table over said dies, an indenting plunger, and means for raising and operating said dies and plunger to connect the clip to the springs and to indent the connected parts, said dies and plunger and operating means therefor being all arranged to operate beneath the top of said table, in combination with means adapted to raise and lower the springs in respect to the dies.

36. A machine for fabricating a spring structure, comprising clip folding dies, means for feeding clip blanks to said dies, and means for feeding spiral wire springs with the loop end thereof to the same dies.

37. A machine for fabricating a spring structure, comprising clip stock feeding mechanism, clip folding dies adapted to connect a clip to the wire loops of two spiral springs, means adapted to feed a predetermined number of spiral springs to said dies, and means adapted to suspend the feeding of clip stock when said predetermined number of springs have been clipped together.

38. A machine for fabricating a spring structure, comprising means for feeding wire and forming spiral springs therefrom, means for feeding clip stock and forming clips therefrom, and means for affixing said clips to the said completed springs contemporaneously with the production of said springs.

39. A machine for fabricating a spring structure, comprising spring-forming devices, clip-folding mechanism, means for feeding spring and clip stock to said devices and mechanism, and means for delivering the springs to said clip-folding mechanism.

40. A machine for fabricating a spring structure, comprising a table, means above said table adapted to deliver springs thereto, and clipping devices within said table adapted to be projected upwardly into a pair of the delivered springs in position to connect them together.

41. A machine for fabricating a spring structure, comprising a vertically movable support adapted to seat a plurality of springs slidably thereon, clip-folding devices beneath said support adapted to project into the bottom ends of the seated springs, and means for raising and lowering said support in respect to said devices.

42. A machine for fabricating a spring structure, comprising spring connecting devices, a vertically-movable table adapted to seat a series of springs opposite said devices, and means adapted to shift the seated springs laterally in respect to said devices.

43. A machine for fabricating a spring structure, comprising spring connecting devices adapted to operate intermittently, a table adapted to seat spiral springs in alignment with said devices, and means adapted to shift the seated springs automatically during inoperative intervals of said connecting devices.

44. A machine for fabricating a spring structure, comprising spring connecting devices adapted to be operated intermittently, mechanism for producing spiral springs adapted to be operated contemporaneously with said device, and means co-acting with said devices and mechanism adapted to feed the springs to said devices during intermissions in operations of said devices.

45. A machine for fabricating a spring structure, comprising spring connecting devices adapted to be operated intermittently, means adapted to produce a spiral spring during each cycle of connecting operations, said means being adapted to deliver each completed spring in line with previously formed springs, and means adapted to shift the connected and unconnected springs at intervals in respect to said devices.

46. A machine for fabricating a spring structure, comprising means for producing spiral springs, means for assembling the springs one by one in a row, means for clamping a pair of the assembled springs in predetermined spaced positions, means for connecting the clamped springs together, said assembling means being adapted to shift the connected springs away from the connecting means at the close of connecting operations.

47. A machine for fabricating a spring structure, comprising means for producing spiral springs, means for assembling the completed springs, means for re-shaping a portion of each spring when assembled, and means for connecting said springs together at their re-shaped portions.

48. A machine for fabricating a spring structure, comprising means for forming spiral springs, means for assembling said springs, means for straightening juxtaposed portions of the assembled springs, and means for clipping the straightened juxtaposed portions of the assembled springs together.

49. A machine for fabricating a spring structure, comprising means for assembling spiral wire springs, means for straightening juxtaposed portions of the assembled springs, means for affixing a metal clip to said juxtaposed straightened portions, and means for indenting said clip in at least one place where affixed.

50. A machine for fabricating a spring structure, including means adapted to fold a metal clip around the free extremity of the loop of one spiral wire spring and around an adjacent wire of the same spring and also around a wire portion of a second spring.

51. A machine for fabricating a spring structure, comprising means adapted to straighten a circular part of the end loop of a spiral wire spring, said end loop having a free wire extremity lying adjacent the circular part to be straightened, and means adapted to fold a metal clip around said extremity and straightened part and also around an additional wire.

52. A machine for fabricating a spring structure, comprising spring-clipping mechanism, and a spring-forming device mounted adjacent thereto and operatively connected therewith to produce springs and clip them together successively.

53. A machine for fabricating a spring structure, comprising spring-clipping mechanism, and a spring-forming device pivotally mounted in respect thereto adapted to deliver the completed springs to said clipping mechanism.

54. A machine for fabricating a spring structure, comprising spring-clipping devices and spring-forming mechanism in geared operating connection, said spring-forming mechanism being arranged to deliver the completed spring to said spring-clipping devices.

55. A machine for fabricating a spring structure, comprising spring - connecting means and spring-forming mechanism in geared operating connection, said spring-forming mechanism being mounted to swing to a delivering position over said spring-connecting means.

56. A machine for fabricating a spring structure, comprising a set of wire-positioning members, a set of pivoted clip-attaching members, and reciprocable wedging devices adapted to operate said respective sets of members successively.

57. A machine for fabricating a spring structure, comprising a set of horizontally reciprocable wire-positioning and clamping members, and a pair of clip-folding dies adapted to convey a blank to the clamped wires.

58. A machine for fabricating a spring structure, comprising a set of reciprocable wire-positioning members, a pair of pivoted clip-folding dies, a vertically-movable support for said dies, and an indenting plunger located between said dies.

59. A machine for fabricating a spring structure, comprising a set of wire clamping members, a pair of clip-folding dies adapted to be raised and lowered in respect to the clamped wires, means adapted to feed a blank upon said dies when lowered, yielding means adapted to hold said blank upon the dies during upward travel thereof, and an indenting plunger located between said dies adapted to follow the upward movement of the dies.

60. A machine for fabricating a spring structure, comprising a set of horizontally-reciprocable wire gripping fingers, a vertically-reciprocable slide, a pair of clip-folding dies pivoted upon said slide, a reciprocable clip-indenting die extending upwardly between said clip-folding dies, and means adapted to rock said clip-folding dies on their respective pivots.

61. A machine for fabricating a spring structure, comprising horizontally-reciprocable wire-gripping fingers, intercepting means between said fingers adapted to bend the gripped wires, a pair of oscillatory clip-folding dies mounted to move vertically in respect to said fingers, means adapted to feed a blank to said dies, and a vertically-reciprocable clip indenting die associated with said folding dies.

In testimony whereof I affix my signature.

DAVID T. OWEN.